(12) United States Patent
Senibi et al.

(10) Patent No.: US 8,714,226 B2
(45) Date of Patent: May 6, 2014

(54) AUTOMATED FIBER PLACEMENT INCLUDING LAYUP MANDREL TOOL

(75) Inventors: Simon D. Senibi, Covington, WA (US); Mostafa Rassaian, Bellevue, WA (US); Richard N. Huizenga, Seattle, WA (US); Gilbert L. Lewis, Kent, WA (US); Jeffery L. Waugh, Bonney Lake, WA (US); Leo E. Dondlinger, Auburn, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/406,522

(22) Filed: Feb. 27, 2012

(65) Prior Publication Data
US 2013/0220521 A1 Aug. 29, 2013

(51) Int. Cl.
*B65H 81/02* (2006.01)
(52) U.S. Cl.
USPC .......................................................... 156/425
(58) Field of Classification Search
USPC ......... 156/425, 428, 429, 490, 431, 433, 446, 156/457
See application file for complete search history.

(56) References Cited

U.S. PATENT DOCUMENTS

| 4,172,562 | A | * | 10/1979 | Smith ........................ 242/439.5 |
| 7,083,698 | B2 | | 8/2006 | Clark et al. |
| 2006/0145049 | A1 | * | 7/2006 | Blankinship ................. 249/66.1 |
| 2006/0278329 | A1 | | 12/2006 | Anderson et al. |
| 2008/0149768 | A1 | * | 6/2008 | Sarh .............................. 244/120 |
| 2008/0230652 | A1 | * | 9/2008 | Biornstad et al. ............. 244/120 |
| 2009/0217529 | A1 | * | 9/2009 | Cerezo et al. ................ 29/897.2 |

FOREIGN PATENT DOCUMENTS

WO 2007148301 A2 12/2007
WO WO 2007148301 A2 * 12/2007

OTHER PUBLICATIONS

"Truss—Definition and More from the Free Merriam-Webster Dictionary", http://www.merriam-webster.com/dictionary/truss, Dec. 9, 2013.*
Flynn et al., "Automated Fiber Placement Machine Developments: Modular Heads, Tool Point Programming and Volumetric Compensation Bring New Flexibility in a Scalable AFP Cell," http://www.electroimpact.com/research/Automated_Fiber_Placement_machine_Developments-SME.pdf.

* cited by examiner

*Primary Examiner* — Daniel McNally
(74) *Attorney, Agent, or Firm* — Hugh P. Gortler

(57) ABSTRACT

A system comprises an automated fiber placement (AFP) machine and a layup mandrel tool supported by the AFP machine. The mandrel tool includes a truss core and a plurality of mandrel panels attached to the truss core to form a layup surface.

11 Claims, 8 Drawing Sheets

FIG. 4
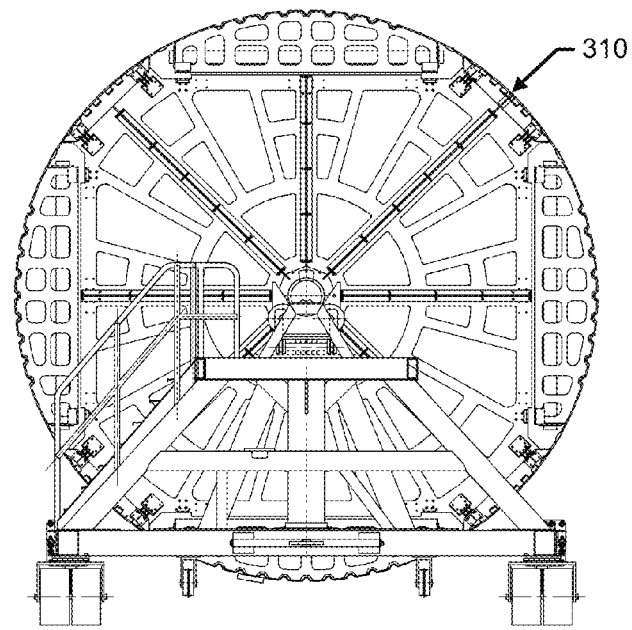
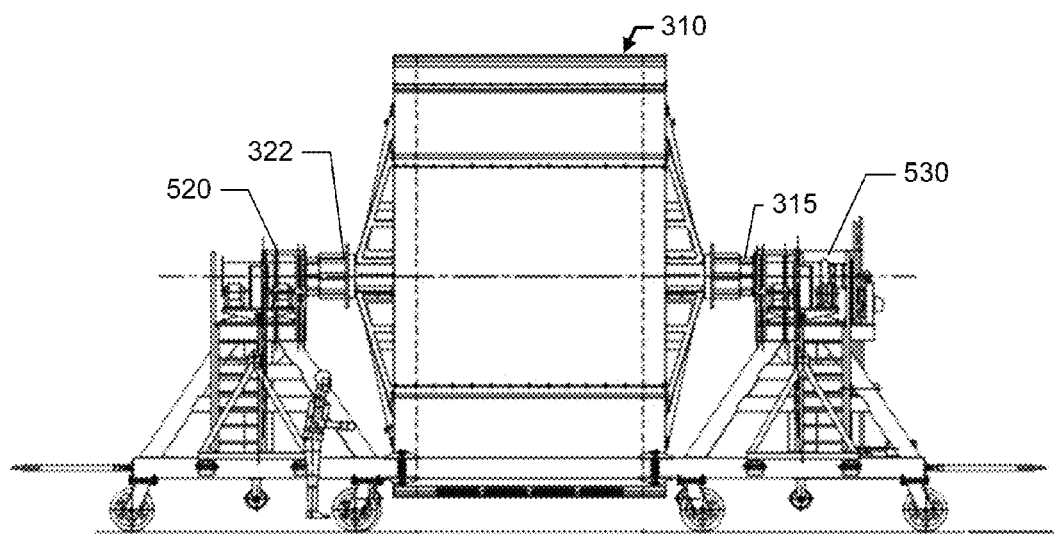
FIG. 5

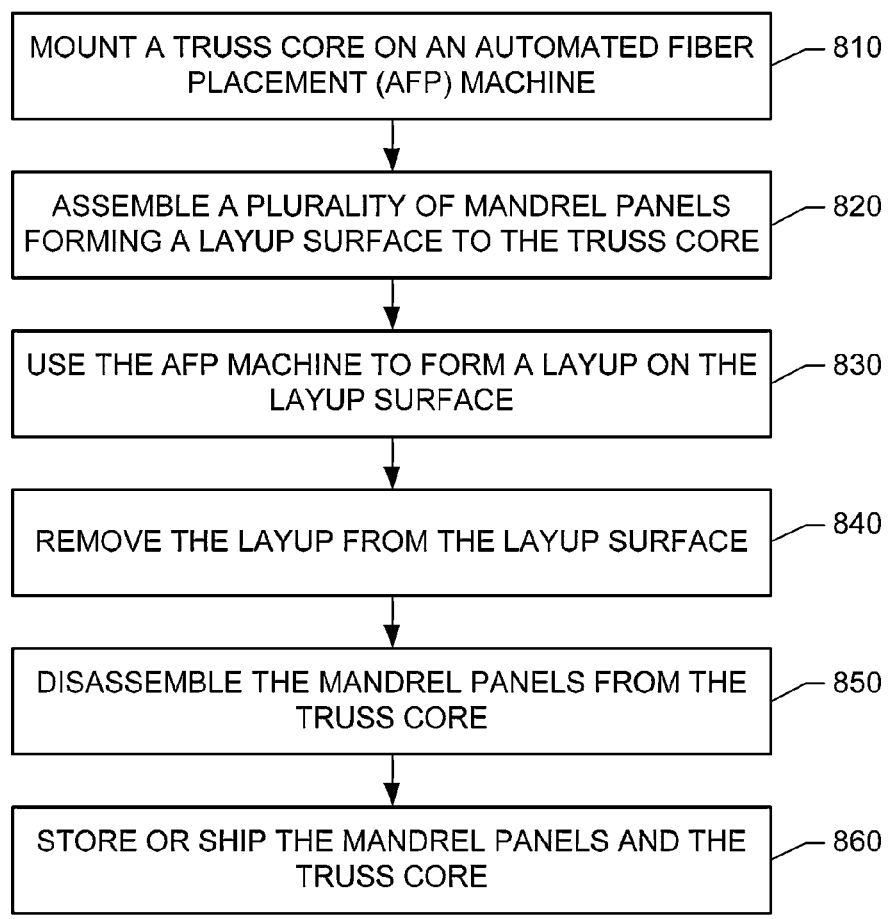

AUTOMATED FIBER PLACEMENT INCLUDING LAYUP MANDREL TOOL

BACKGROUND

Lightweight fiber composites hold great promise for the aircraft industry. Fiber composites provide a significant improvement in specific strength and stiffness over conventional metal alloys. Better specific strength and stiffness translates into weight savings, which translates into fuel savings and lower operating costs.

Fiber composites such as carbon fiber reinforced plastic may be used to fabricate fuselages of commercial aircraft. During fabrication by filament winding, a cylindrical mandrel tool is rotated, and resin-impregnated tape is continuously wound onto a layup surface of the rotating tool. Layer after layer of the tape is applied until a layup of the fuselage is formed. The layup is then cured. Openings for windows, passenger doors, and cargo doors are then cut in the fuselage.

Fabrication by automated fiber placement (AFP) is an alternative to filament winding. During AFP, a fiber placement head deposits bundles of fibers ("tows") onto a rotating mandrel tool. The tows are narrower and more easily manipulated than tape. AFP is most effective when placing material on a curved or contoured surface.

It would be desirable to use AFP to form layups for fuselages of large commercial aircraft. AFP could add extra plies to high stress areas and reduce plies in low stress areas. In addition, AFP could deposit tows at different lengths and orientations to form openings in the layup. This would eliminate the time and effort of cutting openings after the fuselage has been cured.

SUMMARY

According to an embodiment herein, a system comprises an automated fiber placement (AFP) machine and a layup mandrel tool supported by the AFP machine. The mandrel tool includes a truss core and a plurality of mandrel panels attached to the truss core to form a layup surface.

According to another embodiment herein, a mandrel tool comprises a core and a plurality of mandrel panels attachable to and detachable from the core. When attached to the core, the mandrel panels form a full profile layup surface for an aircraft fuselage barrel.

According to another embodiment herein, a method comprises assembling a plurality of mandrel panels to a core to form a layup mandrel tool, and mounting the layup mandrel tool on an automated fiber placement (AFP) machine. The assembled mandrel panels provide a layup surface.

These features and functions may be achieved independently in various embodiments or may be combined in other embodiments. Further details of the embodiments can be seen with reference to the following description and drawings.

BRIEF DESCRIPTION OF THE DRAWINGS

FIGS. 3-5 are illustrations of a layup mandrel tool.

FIG. 8 is an illustration of a method of using an AFP system to form a layup of a composite structure.

DETAILED DESCRIPTION

Figure 1:
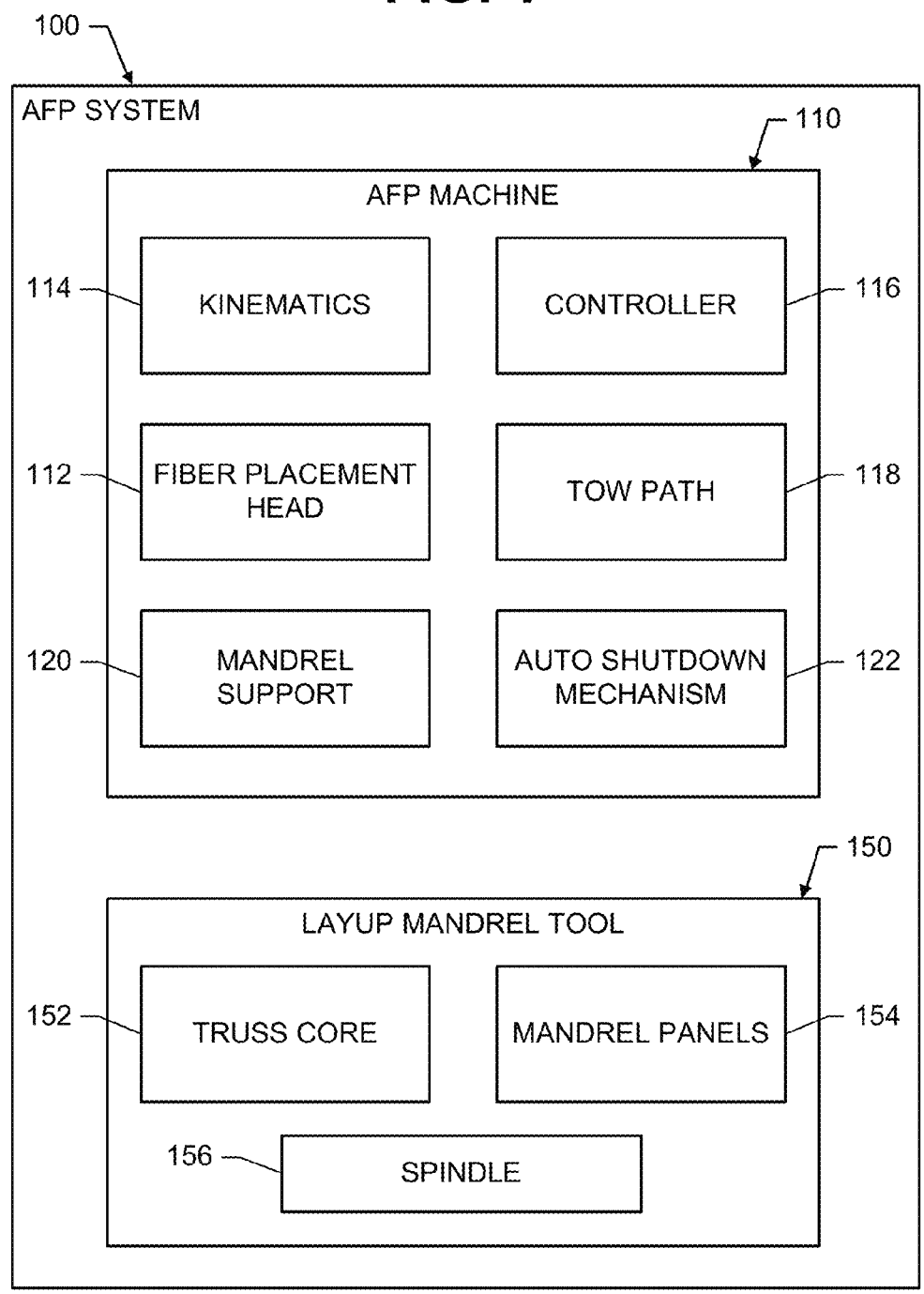
FIG. 1 is an illustration of an AFP system for forming a layup of a composite structure.

Reference is made to FIG. 1, which illustrates an AFP system 100 including an AFP machine 110 for depositing fiber tows on a layup surface of a layup mandrel tool 150. The AFP machine 110 includes a fiber placement head 112 and kinematics 114. A processor-based controller 116 commands the kinematics 114 to move the fiber placement head 112 in a pre-programmed direction, and it commands the fiber placement head 112 to deposit the required amount of fiber tows at a pre-programmed orientation and thickness. The kinematics 114 may include a large multi-axis machine. For instance, the kinematics 114 may include a six-axis machine that moves an end effector and, therefore, the fiber placement head 112 linearly along X, Y and Z axes and rotationally about A, B and C axes. In some embodiments, the fiber placement head 112 may be attached to the end effector, In other embodiments, the fiber placement head 112 may be part of the end effector.

The controller 116 is programmed to deposit the required amount of fiber tows at a required orientation and thickness. For instance, if the structure being fabricated has different areas that carry different load levels, each area is designed to meet a specific load requirement by having a specific amount of tow at a specific orientation and thickness. The required amount, orientation and thickness may be determined from an engineering definition of the structure being fabricated. The engineering definition may define surface geometry including contour and features such as holes, trim locations, and engineering edge of part. The engineering definition may also specify ply drops, ply boundaries stacking sequence and fiber orientations within each ply.

The fiber tows are bundles of reinforcing fibers having a standard width and thickness. Tows that are pre-impregnated with resin may be stored on spools in a refrigerated "creel house." The AFP machine 110 includes a tow path 118 for supplying multiple tows to the fiber placement head 112. In some embodiments, the pre-impregnated tows are fed to a heater and compaction roller on the fiber placement head 112 and deposited in courses across a layup surface The AFP machine 110 further includes a mandrel support 120. In some embodiments, the mandrel support 120 includes headstock and tailstock. The layup mandrel tool 150 is mounted for rotation to the headstock and tailstock.

During operation, the AFP machine 110 rotates the layup mandrel tool 150. As the layup mandrel tool 150 is being rotated, the kinematics 114 move the fiber placement head 112 along the mandrel tool 150, and the fiber placement head 112 deposits tows on the layup surface. If a vibration threshold is exceeded during fiber placement, an automatic shutdown mechanism 122 shuts down AFP machine 110 to avoid breakage of the fiber placement head 112.

The layup mandrel tool 150 includes a truss core 152 and a plurality of mandrel panels 154 attached to the truss core 152 to form the layup surface. A spindle 156 extending through the truss core 152 is mounted to the mandrel support 120. In some embodiments of the layup mandrel tool 150, the mandrel panels 154 may be affixed to the truss core 152. In other embodiments, the mandrel panels 154 may be attachable to the truss core 152 and detachable from the truss core 152. The detachable mandrel panels 154 provide several advantages, which will be discussed below.

An AFP system herein is not limited to any particular application. It may be used to form layups for large structures such as submarine hulls, aircraft wings, and armored vehicle bodies and their guns. However, an AFP system herein is especially useful for forming layups of large composite aircraft fuselages.

Figure 2:
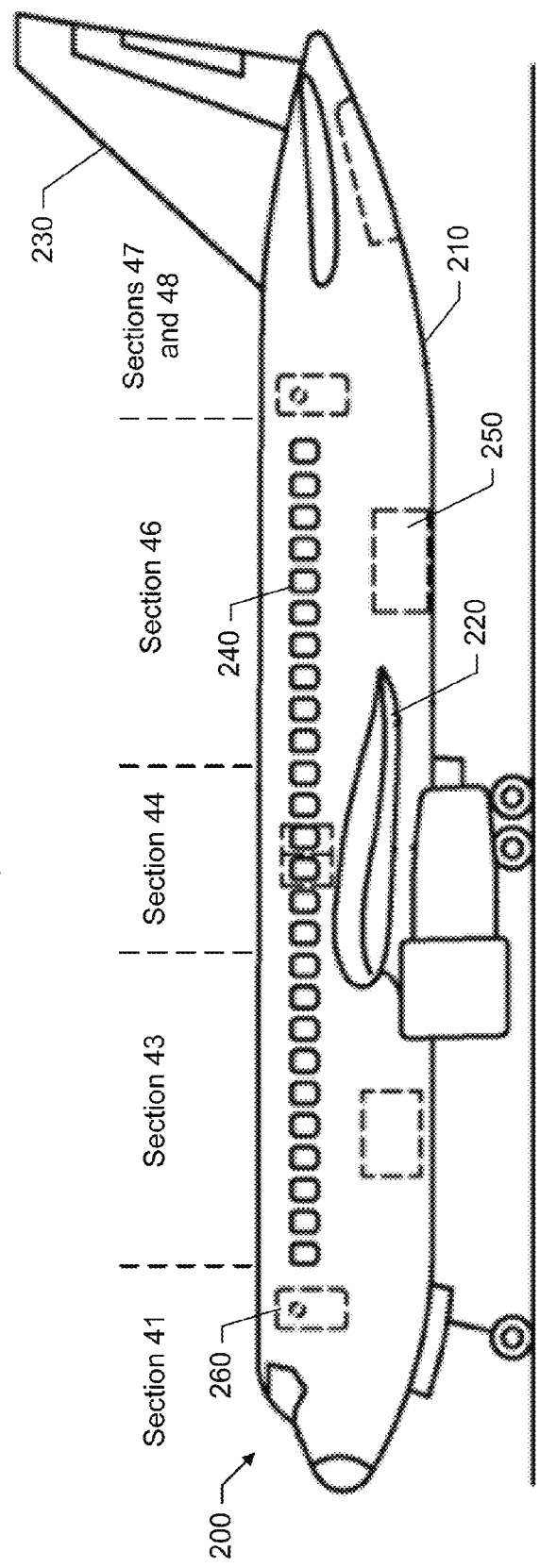
FIG. 2 is an illustration of an aircraft.

Reference is made to FIG. 2, which illustrates an example of a composite aircraft 200. The aircraft 200 generally includes a fuselage 210, wing assemblies 220, and empennage 230. In some embodiments, the entire fuselage 210 may be a single one-piece composite section. In other embodiments, the fuselage 210 may be formed by multiple one-piece composite sections. In the example illustrated in FIG. 2, the fuselage 210 is formed from the following one-piece composite barrel sections: a nose cab section (section 41), three mid sections (sections 43, 44 and 46), and end sections (section 47 and 48).

An AFP system herein can form a layup of fuselage skin, including openings for windows 240, cargo doors 250, and passenger doors 260. It can add extra plies to high stress areas and reduce plies low stress areas. And, in some embodiments, an AFP system herein can form a layup that not only includes fuselage skin, but also an underlying stiffening substructure.

Figure 3:
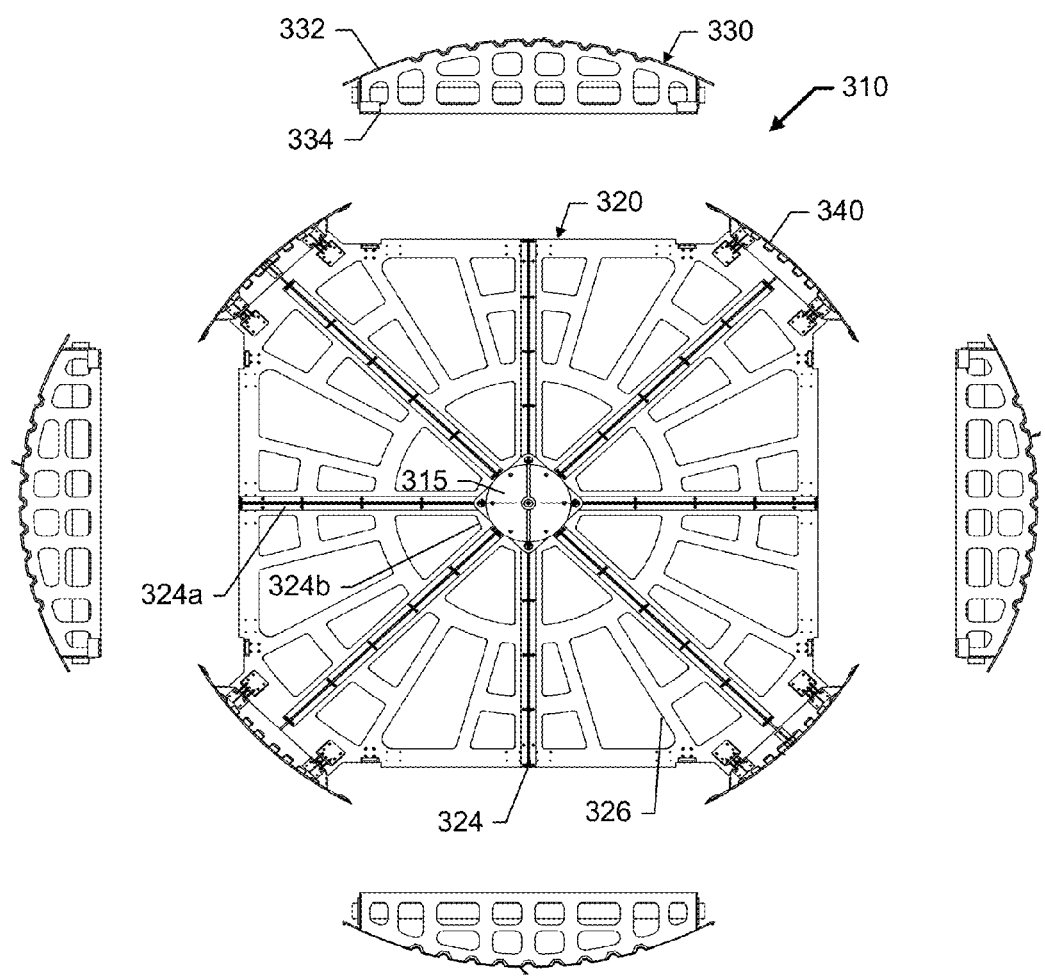

Reference is now made to FIGS. 3-5, which illustrate an embodiment of a layup mandrel tool 310 for an AFP system herein. The layup mandrel tool 310 includes a spindle 315, a truss core 320 and four mandrel panels 330. The truss core 310 is elongated with a roughly rectangular cross-section. The spindle 315 may extend through the truss core 320.

The truss core 320 includes longitudinal beams 322, longitudinal trusses 324, and transverse trusses 326. The longitudinal trusses 324 are located at opposite ends of the truss core 320. Each longitudinal truss 324 includes a hub 324a and beams 324b extending radially outward from the hub 324a. The transverse trusses 324 are connected together and axially spaced apart by the longitudinal beams 322. The spindle is rotatably mounted within the hubs 324a.

Each transverse trusses 326 includes a planar web. Each transverse trusses 326 is adjacent to a longitudinal truss 324. These transverse trusses 326 are connected to their adjacent longitudinal trusses 324. They are also connected to the longitudinal beams 32. The web provides reinforced stability for the layup mandrel tool 310. The combination of the longitudinal and transverse trusses 324 and 325 provides effective and uniform load distribution.

The truss core 320 may include at least one intermediate transverse truss (that is, one or more transverse trusses 326 between the end trusses 326). In some embodiments, an intermediate longitudinal truss may be provided for the intermediate transverse truss.

Figure 3A:
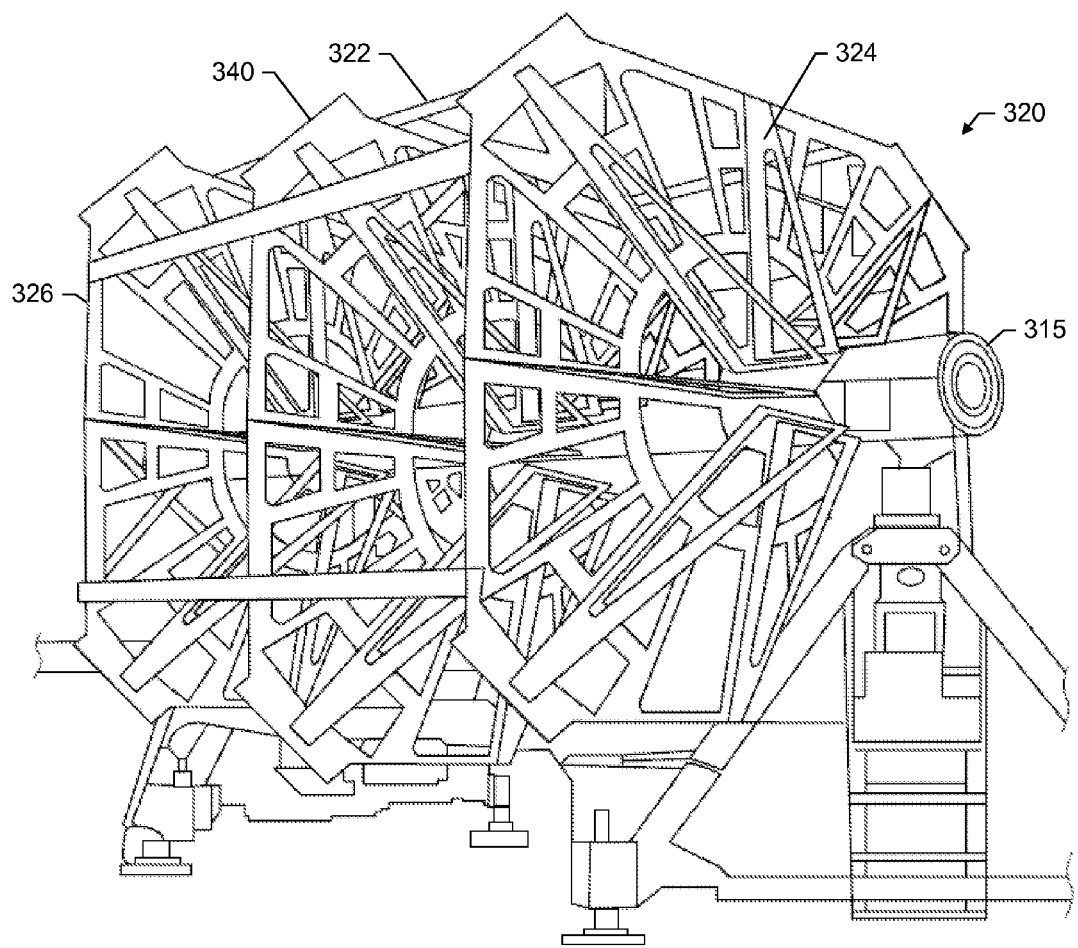

The layup mandrel tool 310 may have its diameter and length adjusted to accommodate different fuselage sizes and shapes. The length of the truss elements may be adjusted to adjust the diameter of the truss core 320. For instance, the diameter may be increased by increasing the length of the truss elements. The length of the longitudinal beams 322 and the number of transverse trusses 326 may be varied to adjust the length of the truss core 320. For instance, the truss core 320 illustrated in FIG. 3a may be lengthened by lengthening the longitudinal beams 322 and adding an intermediate transverse truss 326. In some embodiments, the longitudinal beams 322 may have adjustable lengths and are adjusted with adjusting fasteners. In some embodiments, the longitudinal beams 322 may be replaced with longer beams.

In some embodiments, mandrel panels herein provide a layup surface for fuselage skin. In the mandrel layup tool 310 of FIGS. 3-5, the mandrel panels 330 are configured not only to form a layup of fuselage skin, but also underlying stiffening substructure.

Each mandrel panel 330 includes a face sheet 332 for providing a segment of a layup surface. When attached to the truss core 320, the face sheets 332 of the four mandrel panels 330 form a full profile layup surface of a fuselage barrel section. The mandrel panels 330 provide curvature to the layup surface. The layup surface may have a large diameter (e.g., at least 19 feet).

Each mandrel panel 330 may further include a stiffening support structure 334 to ensure that the face sheets 332 have necessary stiffness during fiber placement. The stiffening support structure 334 maintains minimum displacement when the fiber placement head 112 makes contact with the face sheet 332 to avoid the formation of dimples and wrinkles. The stiffening support structure 334 also interfaces the face sheet 332 with the truss core 310.

Overall diameter of the layup surface is function of the depth of the mandrel panels as well as the size of the truss core. The layup surface diameter may be adjusted according to the height of the mandrel panels.

In the embodiment of FIG. 3, the mandrel panels 330 may be attached to the truss core 310 and detached from the truss core 310. The layup mandrel tool 310 includes transition panels 340 at corners of the truss core 310 for attaching the mandrel panels 330 to the truss core 310 and detaching the mandrel panels 330 from the truss core 310. The mandrel panels 330 may be slidably mounted and locked within fixture grooves in the transition panels 340. In some embodiments, the mandrel panels 330 may be bolted to the transition panels 340.

Figure 6:
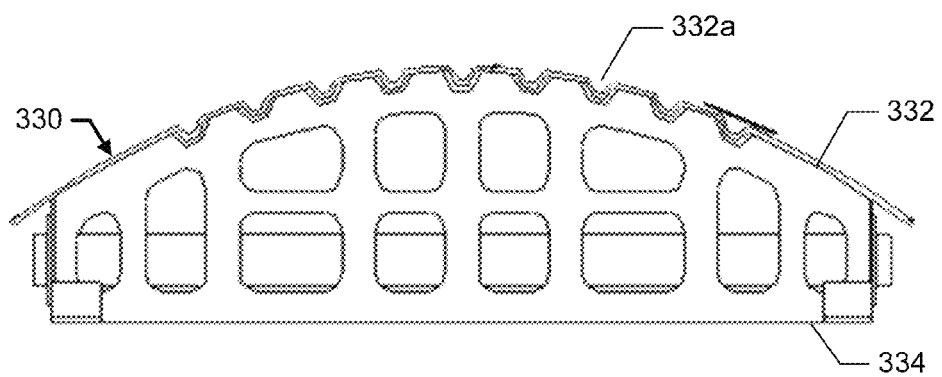
FIG. 6 is an illustration of a mandrel panel of the layup mandrel tool.

Reference is now made to FIG. 6, which illustrates a mandrel panel 330 of the layup mandrel tool 310. The face sheet 332 has grooves 332a for forming stringers, which form a part of the stiffening substructure. The AFP machine 110 can lay down short courses of tows to line the grooves 332a. After the AFP machine 110 lays down short courses to fill the grooves, it lays down longer courses over the face sheet 332 to fabricate the skin of the fuselage. The cutouts in the stiffening structure 334 reduce weight of the stiffening structure 334.

Figure 7:
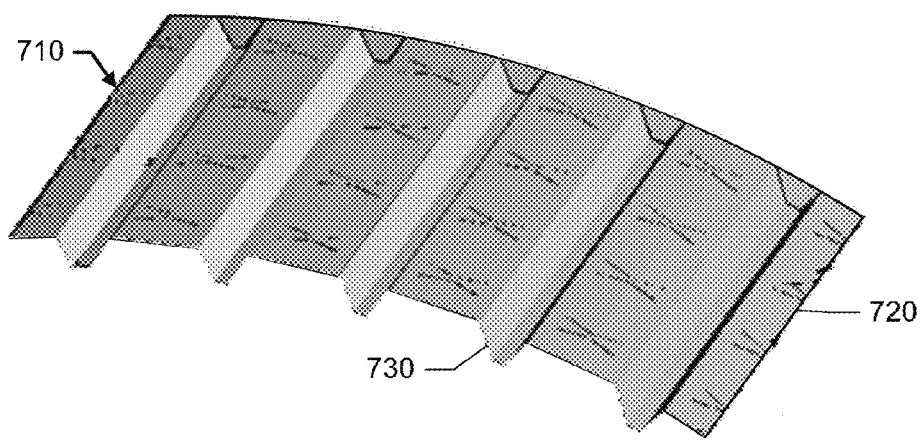
FIG. 7 is an illustration of a portion of a fuselage produced by the mandrel panel of FIG. 6.

Additional reference is made to FIG. 7, which illustrates a portion 710 of a fuselage produced by the panel 330 of FIG. 6. The portion 710 includes fuselage skin 720 integrated with stringers 730. The skin 720 and stringers 730 are co-cured to form a one-piece fuselage barrel section.

FIGS. 4 and 5 show the layup mandrel tool 310 mounted to the AFP machine. The spindle 315 is mounted to headstock 520 and tailstock 530 of the AFP machine.

Figure 9A:
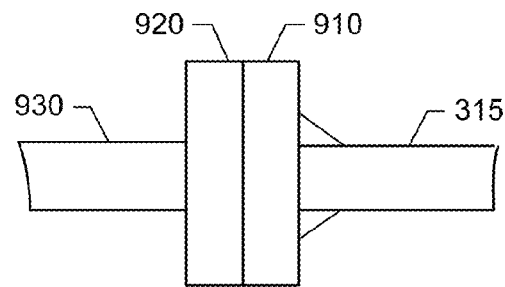
FIG. 9a is an illustration of an interface between the layup mandrel tool and an AFP machine.

Reference is now made to FIG. 9A, which provides an example of how the spindle 315 may be mounted to the headstock 520 and tailstock 530. A tooling face plate 910 at the end of the spindle 315 is fastened to a machine face plate 920 of the AFP machine. The tooling face plate 910 may be welded to the spindle 315 and bolted to the machine face plate 920. The machine face plate 920 is rotated by a spindle 930 of the AFP machine.

The layup mandrel tool 310 may also be configured to damp vibrations during fiber placement. The vibrations result from two main sources: stress and displacement due to periodic contact of the fiber placement head; and torsional stress and displacement due to angular acceleration due to rotating such an extremely large structure.

Finite Element Modeling (FEM) and stress analysis maybe performed to accurately predict the torsional frequency of the layup tool as it is being rotated at a working angular acceleration. FEM may be performed to predict stress and displacement due to the pressure from the AFP head.

Figure 9B:
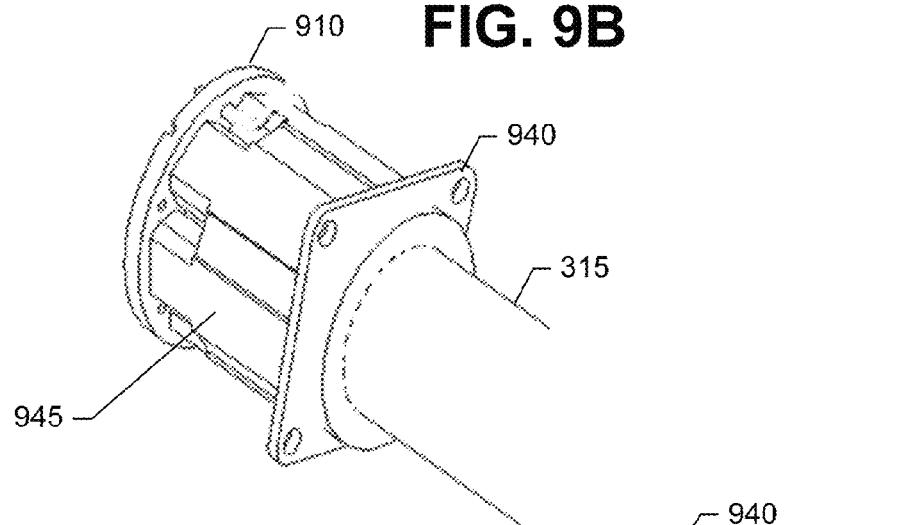
FIGS. 9b and 9c are illustrations of a spindle mounting block for reducing mandrel tool vibration during fiber placement.
Figure 9C:
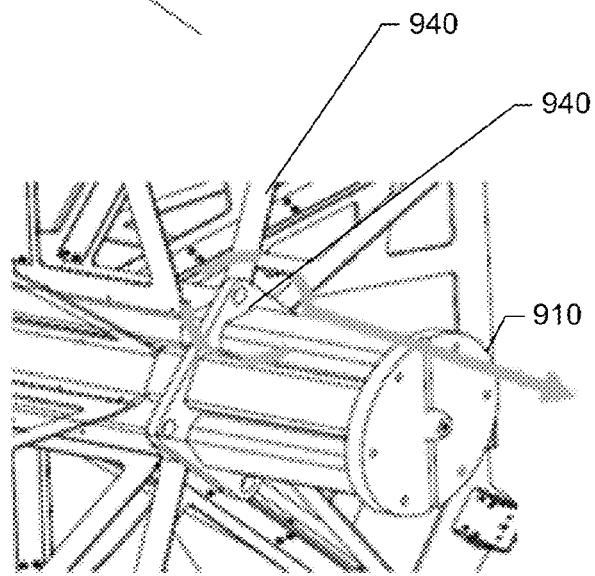

Reference is now made to FIGS. 9B and 9C. The vibrations may be damped by adding frequency tuned end mount details 940 to both ends of the spindle 315. The details may include shaped plates. The size, shape and thickness of the mounting details 940 and the relative distance between the longitudinal truss 324 and the face plate 940 may be based on the predicted torsional frequency, stress and displacement. Ridges 945 between the plates 910 and 940 may be used to provide additional frequency tuning to dampen vibrations.

The mounting detail 940 may be mounted to the spindle 315 between the tooling face plate 910 and the truss core 310. For instance, the mounting detail 940 may be welded to the spindle 315. Mounting the details 940 on the spindle 315 is advantageous for embodiments in which the mandrel panels are disassembled. The spindle-mounted details 940 do not affect the torsional frequency of the truss core 320. They do not interfere with the disassembly of the mandrel panels 330. Mounting the details 940 to the spindle 315 instead of the truss core 320 makes the truss core 320 easier to disassemble. It also results in easier access to the fiber placement head 112.

Reference is now made to FIG. 8, which illustrates a method of using an AFP machine herein. At block 810, a truss core is mounted to headstock and tailstock of an AFP machine. At block 820, a plurality of mandrel panels are attached to the truss core to form a layup surface. At block 830, the AFP machine is used to form a layup on the layup surface.

At block 840, the layup is cured. As a first example, the layup mandrel tool may be moved to an autoclave for curing. As a second example, the layup may be transferred to an outer mold line tool (which gives the outer surface of the fuselage section an aero-quality finish). The layup is cured on the outer mold line tool. After the layup has been cured, it is removed from the layup mandrel tool.

At block 850, after a decision has been made to disassemble the layup mandrel tool, the mandrel panels are disassembled from the truss structure. At block 860, the mandrel panels and the truss core may be placed in storage, or they may be transported separately to another location.

The ability to disassemble the layup mandrel tool 310 and thereafter reassemble it is especially valuable for the fabrication of large commercial aircraft fuselages. For instance, the layup mandrel tool 310 may be disassembled at one site, the various components 320 and 330 may be shipped separately to a second site, and the components 320 and 330 may be reassembled at the second site. Shipping the components instead of a single large structure eases transportation logistics and costs, and it reduces overhead costs. In some embodiments, the beams 322 and trusses 324 and 326 may be connected with fasteners, which allows the truss core 320 to be assembled and disassembled for ease of transportation.

Even if the components 320 and 330 are not shipped, the disassembly and subsequent reassembly of the layup mandrel tool 310 can result in more effective use of floor space. An assembled layup mandrel tool 310 may have a large footprint on the floor of a fabrication facility. Floor space can be freed up while the layup mandrel tool 310 is not in use. The layup mandrel tool 310 may be disassembled and its components moved to storage. When the layup mandrel tool is needed, its components are taken out of storage, unpacked and reassembled.

The detachability of the panels 330 is advantageous for the additional reason that it reduces tooling costs. One set of panels 330 may be attached to the truss core 310 for a fuselage section having one configuration, and another set of panels 330 may be attached to the truss core 310 for a fuselage section having another configuration. The different configurations may include, without limitation, different diameters and different surface configurations. For instance, different sets of panels 330 may be used to form different layups for sections 43, 44 and 46 of the aircraft 200 of FIG. 2. The truss core 310 is reused with those different sets of panels 330.

The invention claimed is:

1. A system comprising:
   an automated fiber placement (AFP) machine including headstock and tailstock; and
   a layup mandrel tool supported by the AFP machine, the mandrel tool including a truss core, a plurality of mandrel panels attached to the truss core to form a layup surface, and a spindle extending through the truss core and mounted to the headstock and tailstock, the spindle configured to damp vibrations of the mandrel tool during laydown by an AFP head.

2. The system of claim 1, wherein the mandrel panels are configured to provide a full profile layup surface for an aircraft fuselage section.

3. The system of claim 2, wherein the layup surface has a portion for forming fuselage skin and grooves for forming stringers.

4. The system of claim 1, wherein the AFP machine includes a fiber placement head that is movable in a pre-programmed direction to deposit tows on the mandrel tool at a pre-programmed orientation and thickness.

5. The system of claim 1, wherein mounting details are mounted to ends of the spindle to damp the vibrations, the mounting details designed according to predicted torsional frequency and predicted stress and displacement due to pressure from the AFP head.

6. The system of claim 1, wherein the truss core includes a spindle, transverse end trusses extending radially outward from the spindle, and longitudinal beams bridging the transverse trusses.

7. The system of claim 1, further comprising transition pieces at corners of the truss core for attaching the mandrel panels to the truss core and detaching the mandrel panels from the truss core.

8. The system of claim 1, wherein the truss core is elongated with a rectangular cross-section; and wherein the panels provide curvature to the layup surface.

9. The system of claim 1, wherein the truss core is extendable in length and diameter.

10. The system of claim 1, wherein each mandrel panel includes a face sheet and stiffening support structure, the support structure adjacent the truss core.

11. The system of claim 1, wherein the layup mandrel tool has a diameter of at least 19 feet.

* * * * *